United States Patent [19]
Chen

[11] Patent Number: 6,109,789
[45] Date of Patent: Aug. 29, 2000

[54] LINEAR SLIDE

[76] Inventor: Hsi-Kuan Chen, 13F-2, No. 92, Chung-Kung-Erh Rd., Hsi-Dist., Taichung City, Taiwan

[21] Appl. No.: 09/317,236

[22] Filed: May 24, 1999

[51] Int. Cl.[7] ........................................... F16C 29/06
[52] U.S. Cl. .............................. 384/48; 384/45; 384/44
[58] Field of Search .................................... 384/48, 44, 45

[56] References Cited

U.S. PATENT DOCUMENTS

| | | | |
|---|---|---|---|
| 4,692,037 | 9/1987 | Kasai | 384/44 |
| 4,988,215 | 1/1991 | Osawa | 384/44 |
| 5,193,914 | 3/1993 | Tanaka | 384/45 |
| 5,228,783 | 7/1993 | Ueki | 384/44 |
| 5,273,365 | 12/1993 | Kondoh | 384/44 |

*Primary Examiner*—Thomas R. Hannon
*Attorney, Agent, or Firm*—Hoffmann & Baron, LLP

[57] ABSTRACT

A linear slide includes an elongated guide rail and a sliding block straddling the guide rail. A plurality of rolling elements are disposed between the sliding block and the guide rail so that the sliding block is capable of sliding back and forth along the length of the guide rail. The rolling elements include cylindrical roller trains, which are carried on the upper surface of the guide rail, and rolling ball trains which are carried on the lateral surfaces of the guide rail.

3 Claims, 6 Drawing Sheets

LINEAR SLIDE

BACKGROUND OF THE INVENTION

The present invention relates to a linear slide, more particularly to a durable linear slide with a relatively large load bearing capacity and capable of high-precision linear movement.

Referring to FIGS. 1 and 2, in a first conventional linear slide 10, a sliding block 12 straddles a guide rail 11 and is movable back and forth along the length of the rail 11 by means of pairs of steel rolling ball trains 13 loaded on two lateral surfaces and an upper surface of the rail 11. Because the contact between steel balls and the surfaces of the rail 11 is by point, a straight linear path of movement for the sliding block 12 can be maintained. In other words, a high degree of precision can be achieved for the sliding movement. However, the service life of a steel ball is only about 50 Km, which impedes a continuous service of a desirable duration for the linear slide 10.

Referring to FIGS. 3 and 4, in a second conventional linear slide 20, a sliding block 22 also straddles a guide rail 21. The opposite lateral surfaces of the rail 21 are provided with grooves 23 of a V-shaped cross-section. Two cylindrical roller trains 24,25 are disposed in each of the grooves 23 at right angles such that the axes of the rollers in the two roller trains 24, 25 in the same groove 23 are at right angles, as shown in FIG. 4. Thus, the sliding block 22 is capable of moving back and forth along the length of the guide rail 21. Due to the higher rigidity and strength of the rollers (the expected service life of which is about 100 Km) of the roller trains 24,25 as compared to those of the rolling balls, the service life of this type of linear slide 20 is longer. However, when a positive force is exerted on the slide 22 as shown in FIG. 4, the lower roller train 25 bears a greater amount of the force because the contact surface in the direction of the force is larger for the lower roller train 25 than that for the upper roller train 24. Moreover, the lower roller train 25 flares towards the sliding block 22, and this renders the vertical parts of the latter to expand, thereby impairing alignment and precision of sliding movement of the linear slide 20.

In a third conventional linear slide 30 shown in FIGS. 5 and 6, a sliding block 32 also straddles a guide rail 31. The lateral surfaces of the rail 31 are respectively provided with a channel 311, and the sliding block 32 is provided with two pairs of grooves 321 opposing and adjacent to upper and lower sections of the channels 311. The grooves 321 constitute portions of circulation passages 33 for steel rolling ball trains 34, 35. By this structure, the sliding block 32 is allowed to move back and forth along the length of the guide rail 31. Since a pressure is exerted to the vertical parts of the sliding block 32 through the rolling ball trains 34, 35, the tendency to expand outward remains unresolved. In addition, the use of rolling ball trains 34, 35 as rolling elements entails an unsatisfactory shorter service life.

SUMMARY OF THE INVENTION

Therefore, the main object of the present invention is to provide a linear slide with a relatively high load bearing capacity and capable of high-precision linear movement.

Another object of the present invention is to provide a linear slide with a relatively long service life.

Accordingly, a linear slide of the present invention generally includes an elongated guide rail and a sliding block of an inverted U-shaped cross-section. The guide rail has a flat upper surface and two lateral surfaces. Each of the lateral surfaces is formed with a longitudinally extending first ball groove. The sliding block has an elongated horizontal part with front and rear ends opposite to each other in a longitudinal direction, and lateral sides opposite to each other in a transverse direction and extending between said front and rear ends. The horizontal part has a flat lower surface formed with parallel first and second rectilinear grooves that extend in the longitudinal direction. The horizontal part is further formed with parallel first and second longitudinal bores that extend in the longitudinal direction and that are vertically and respectively aligned with the first and second rectilinear grooves. The sliding block further has two vertical parts depending downwardly and respectively from the lateral sides of the horizontal part. Each of the vertical parts has an inner surface formed with a second ball groove that extends in the longitudinal direction. Each of the vertical parts is further formed with a third longitudinal bore that extends in the longitudinal direction and that is horizontally aligned with the second ball groove. The sliding block straddles the guide rail such that the lower surface of the horizontal part of the sliding block confronts the upper surface of the guide rail, and such that the inner surface of each of the vertical parts of the sliding block confronts a respective one of the lateral surfaces of the guide rail. Each of a pair of rolling ball trains extends into the third longitudinal bore in a respective one of the vertical parts of the sliding block and into a ball receiving hole confined by the first ball groove in a respective one of the lateral surfaces of the guide rail and the second ball groove in the inner surface of the respective one of the vertical parts of the sliding block. Each of a pair of cylindrical roller trains extends into a respective one of the first and second longitudinal bores and into a respective one of the first and second rectilinear grooves of the sliding block for sliding contact with the upper surface of the guide rail. Thus, the sliding block is capable of sliding back and forth along the guide rail.

Preferably, each of the first and second ball grooves is a Gothic groove. In addition, a sleeve member is mounted in each of the first and second longitudinal bores for retaining a respective one of the cylindrical roller trains on the sliding block.

BRIEF DESCRIPTION OF THE DRAWINGS

The above and other objects, features and advantages of the invention will become clear from the following description of the preferred embodiment with reference to the accompanying drawings.

DETAILED DESCRIPTION OF THE PREFERRED EMBODIMENT

Figure 1:
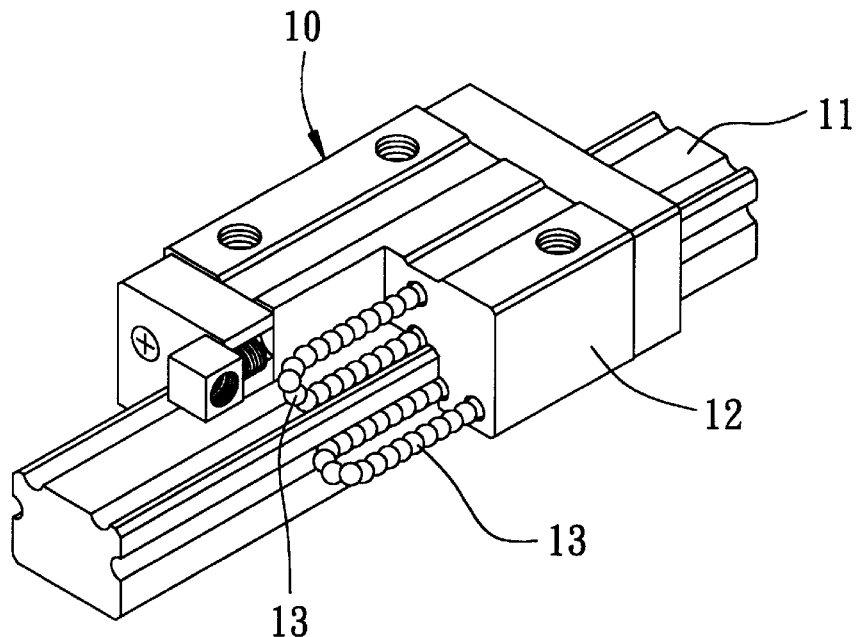
FIG. 1 is a perspective view showing a first conventional linear slide.
Figure 2:
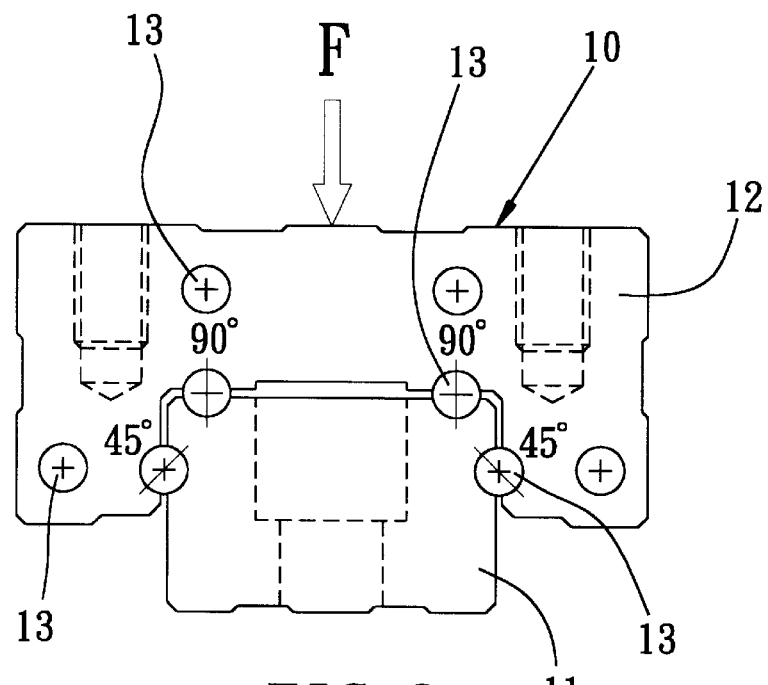
FIG. 2 is a schematic view of the first conventional linear slide.
Figure 3:
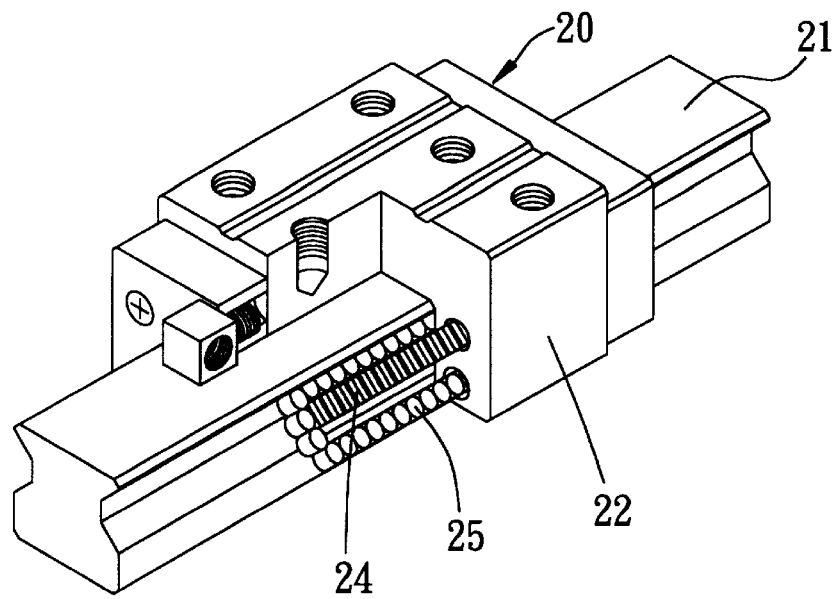
FIG. 3 is a perspective view showing a second conventional linear slide.
Figure 4:
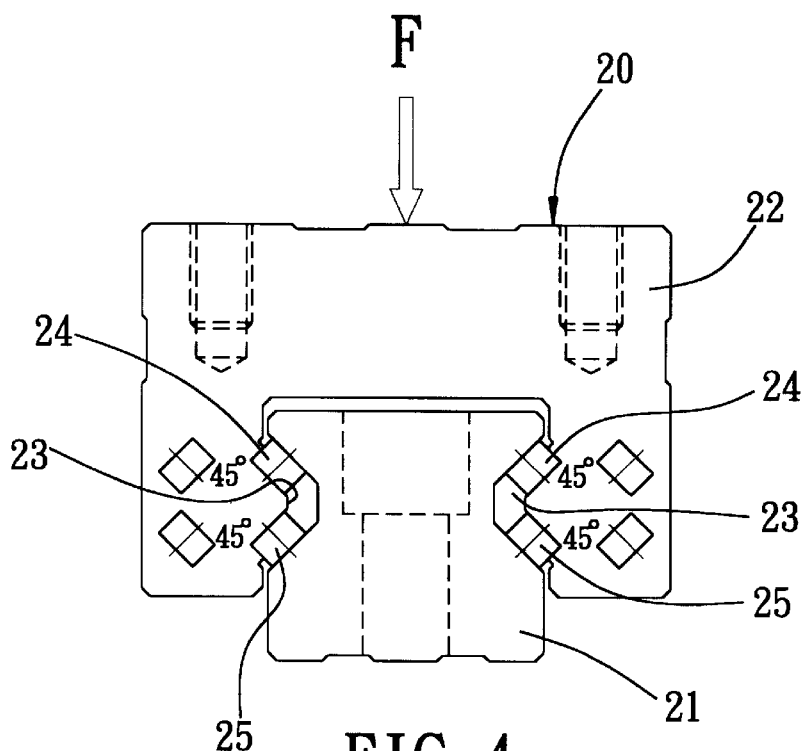
FIG. 4 is a schematic view of the second conventional linear slide.
Figure 5:
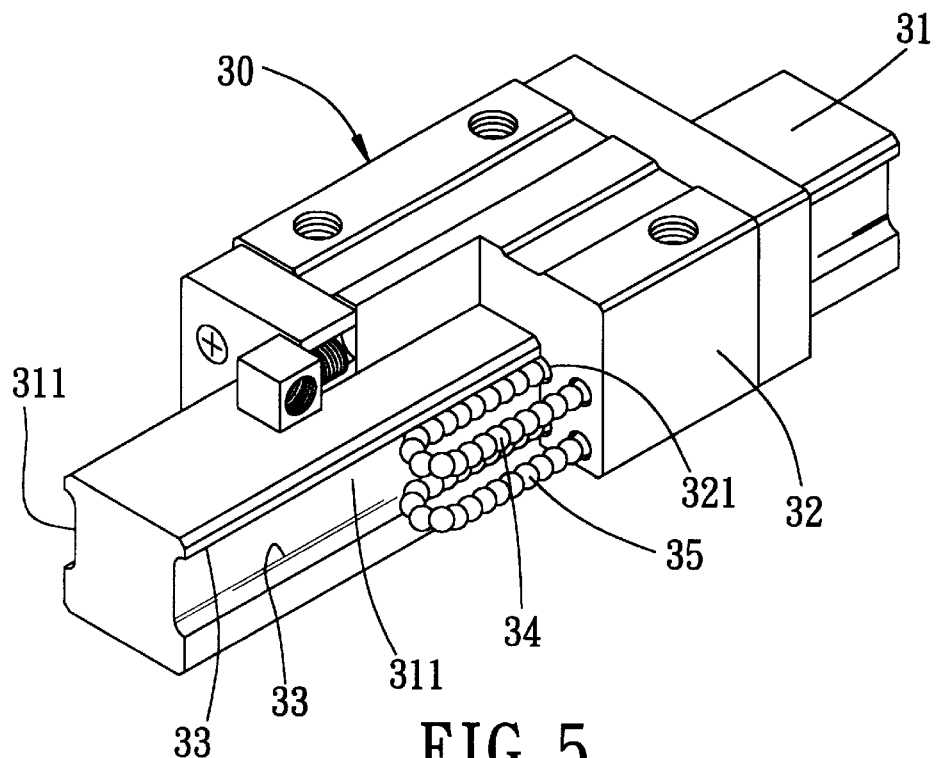
FIG. 5 is a perspective view showing a third conventional linear slide.
Figure 6:
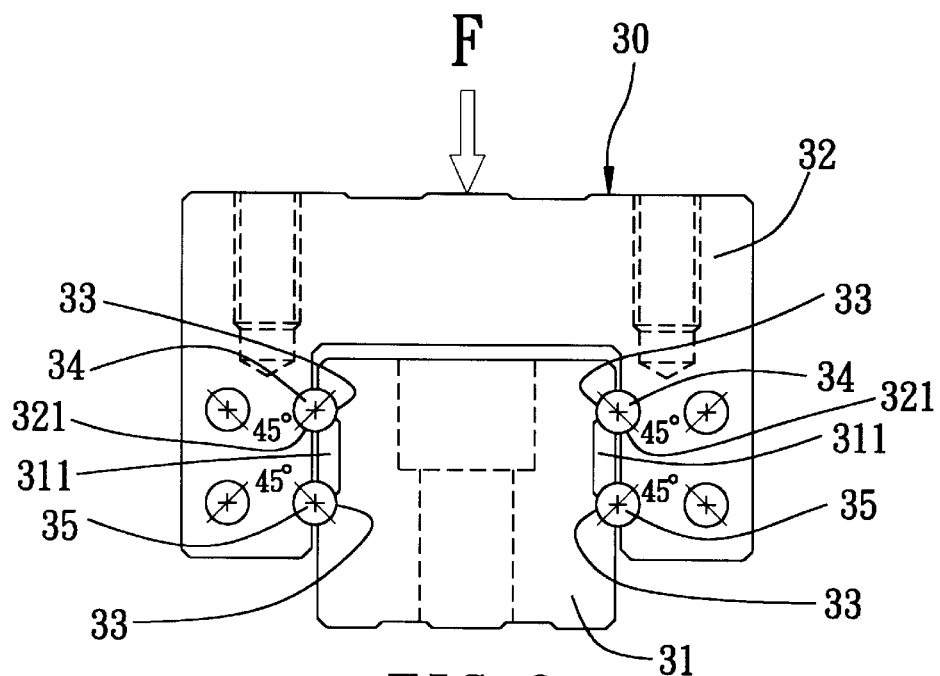
FIG. 6 is schematic view of the third conventional linear slide.
Figure 7:
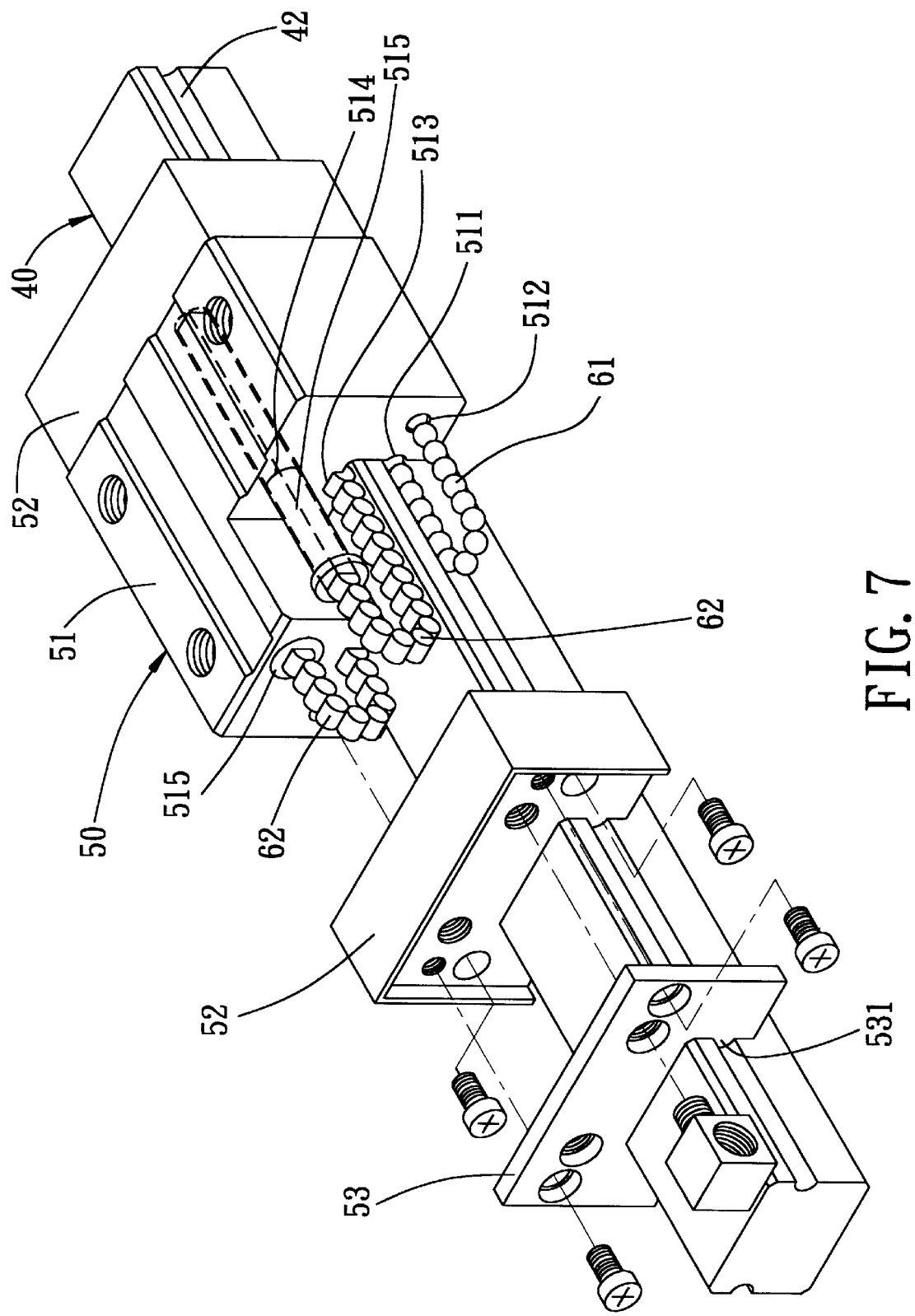
FIG. 7 is a partly exploded perspective view of a preferred embodiment of a linear slide according to the present invention.
Figure 8:
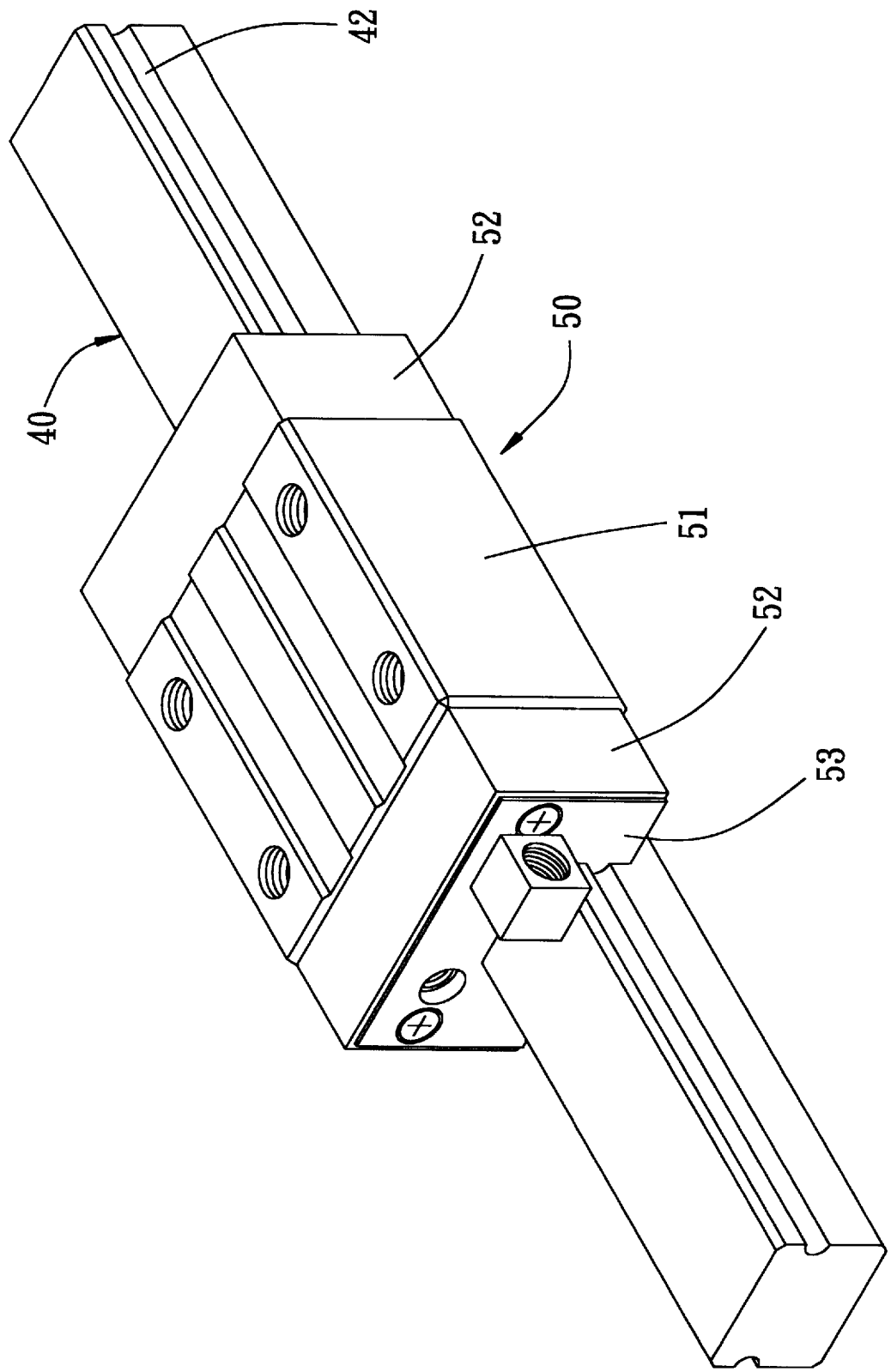
FIG. 8 is an assembled perspective view of the preferred embodiment.
Figure 9:
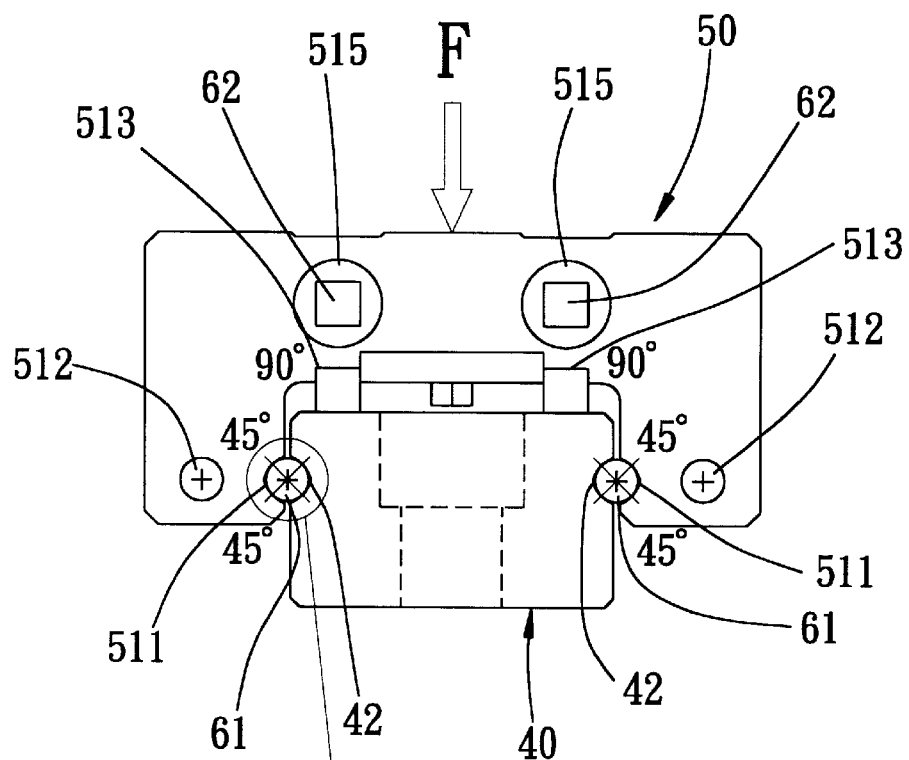
FIG. 9 is schematic view of the preferred embodiment.

The preferred embodiment of the linear slide of the invention will be described hereinunder with respect to FIGS. 7, 8 and 9. As shown in these drawings, the linear slide has an elongated guide rail 40 typically mounted on a stationary bed (not shown). The guide rail 40 has a flat upper surface and two lateral surfaces, each of which is formed with a longitudinally extending Gothic ball groove 42. A sliding block 50 of the linear slide has a main section 51, end sections 52 on opposite ends of the main section 51, and dust caps 53 at outer sides of the end sections 52. The main section 51 is formed as a block of an inverted U-shaped cross-section, and has an elongated flat horizontal part with front and rear ends opposite to each other in a longitudinal direction, and lateral sides opposite to each other in a transverse direction and extending between the front and rear ends of the main section 51. On a flat lower surface of the horizontal part of the main section 51, there are formed a pair of parallel rectilinear grooves 513 that extend in the longitudinal direction. The horizontal part of the main section 51 is further formed with a pair of parallel longitudinal bores 514 that extend in the longitudinal direction and that are vertically and respectively aligned with the rectilinear grooves 513. A sleeve member 515 is mounted in each of the longitudinal bores 514 and defines a roller passage of a rectangular cross-section, the purpose of which will be described in the succeeding paragraphs.

The main section 51 further has two vertical parts that depend downwardly and respectively from the lateral sides of the horizontal part. Each of the vertical parts has an inner surface formed with a Gothic ball groove 511 that extends in the longitudinal direction. Each of the vertical parts is further formed with a longitudinal bore 512 that extends in the longitudinal direction and that is horizontally aligned with the ball groove 511.

The sliding block 50 straddles the guide rail 40 such that the lower surface of the horizontal part of the main section 51 confronts the upper surface of the guide rail 40, and such that the inner surface of each of the vertical parts of the main section 51 confronts a respective one of the lateral surfaces of the guide rail 40.

Figure 10:
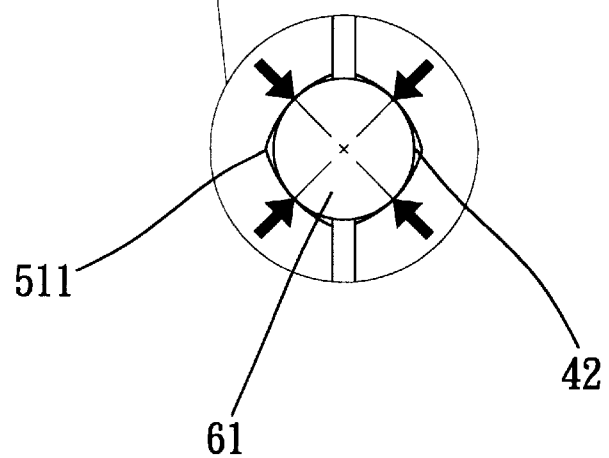
FIG. 10 is an enlarged schematic view of an encircled portion depicted in FIG. 9 to show four point contacts between a rolling ball and surfaces of two opposing Gothic grooves in the linear slide of the preferred embodiment.

Each of a pair of rolling ball trains 61 extends into the longitudinal bore 512 in a respective one of the vertical parts of the main section 51 and into a ball receiving hole confined by the Gothic ball groove 42 in a respective one of the lateral surfaces of the guide rail 40 and the Gothic ball groove 511 in the inner surface of the respective one of the vertical parts of the main section 51. The longitudinal bore 512 and the associated ball receiving hole form a circulation passage for the respective rolling ball train 61. The ball receiving hole provides four point contacts between each rolling ball of the train 61 and the surfaces of the opposing Gothic ball grooves 42, 511, as illustrated in FIG. 10. The partial pressures acting through the four point contacts are orthogonal to each other such that each pair of forces acting in opposite directions can be offset. Therefore, the tendency for the sliding block 50 to deform outward, as encountered in the second and third conventional linear slides described beforehand, can be eliminated.

Each of a pair of cylindrical roller trains 62 extends into the roller passage of the sleeve member 515 in a respective one of the longitudinal bores 514 such that the roller trains 62 are retained on the sliding block 50. Each roller train 62 further extends into a respective one of the rectilinear grooves 513 for sliding contact with the upper surface of the guide rail 40. The longitudinal bore 514 and the associated rectilinear groove 513 form a circulation passage for the respective cylindrical roller train 62.

The end sections 52 are mounted respectively on the front and rear ends of the main section 51 with the use of screw fasteners, and the dust caps 53 are mounted respectively on the outer sides of the end sections 52 also with the use of screw fasteners. A pair of flanges 531 (only one is shown) with a shape that complements the Gothic ball groove 511 is provided on the dust cap 53 and extends into the respective groove 511 to prevent spillage of lubricant therefrom.

After assembly, the rolling ball trains 61 and the cylindrical roller trains 62 are movably received within their respective circulation passage. Referring again to FIGS. 9 and 10, as compared to the first conventional linear slide described above, by substituting the more rigid and durable cylindrical roller trains 62 for two of the rolling ball trains 13 in the conventional linear slide 10, the service life of the linear slide of the present invention can be prolonged, and the maintenance cost can be significantly reduced. In addition, the four point contacts between each rolling ball of the trains 61 and the surfaces of the Gothic ball grooves 42, 511 result in balanced partial pressures exerted on the sliding block 50 and the guide rail 40, thereby obviating the tendency of flaring deformation of the sliding block 50.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A linear slide comprising:
   an elongated guide rail having a flat upper surface and two lateral surfaces, each of said lateral surfaces being formed with a longitudinally extending first ball groove;
   a sliding block of an inverted U-shaped cross-section and having an elongated horizontal part with front and rear ends opposite to each other in a longitudinal direction, and lateral sides opposite to each other in a transverse direction and extending between said front and rear ends, said horizontal part having a flat lower surface formed with parallel first and second rectilinear grooves that extend in the longitudinal direction, said horizontal part being further formed with parallel first and second longitudinal bores that extend in the longitudinal direction and that are vertically and respectively aligned with said first and second rectilinear grooves, said sliding block further having two vertical parts depending downwardly and respectively from said lateral sides of said horizontal part, each of said vertical parts having an inner surface formed with a second ball groove that extends in the longitudinal direction, each of said vertical parts being further formed with a third longitudinal bore that extends in the longitudinal direction and that is horizontally aligned with said second ball groove;
   said sliding block straddling said guide rail such that said lower surface of said horizontal part of said sliding block confronts said upper surface of said guide rail, and such that said inner surface of each of said vertical parts of said sliding block confronts a respective one of said lateral surfaces of said guide rail;

a pair of rolling ball trains, each of which extends into said third longitudinal bore in a respective one of said vertical parts of said sliding block and into a ball receiving hole confined by said first ball groove in a respective one of said lateral surfaces of said guide rail and said second ball groove in said inner surface of the respective one of said vertical parts of said sliding block; and a pair of cylindrical roller trains, each of which extends into a respective one of said first and second longitudinal bores and into a respective one of said first and second rectilinear grooves of said sliding block for sliding contact with said upper surface of said guide rail;

whereby, said sliding block is capable of sliding back and forth along said guide rail.

2. A linear slide as defined in claim 1, wherein each of said first and second ball grooves is a Gothic groove.

3. A linear slide as defined in claim 1, further comprising a sleeve member mounted in each of said first and second longitudinal bores for retaining a respective one of said cylindrical roller trains on said sliding block.

* * * * *